W. W. DUNCAN.
TESTING MACHINE.
APPLICATION FILED JULY 20, 1908.
919,140.
Patented Apr. 20, 1909.
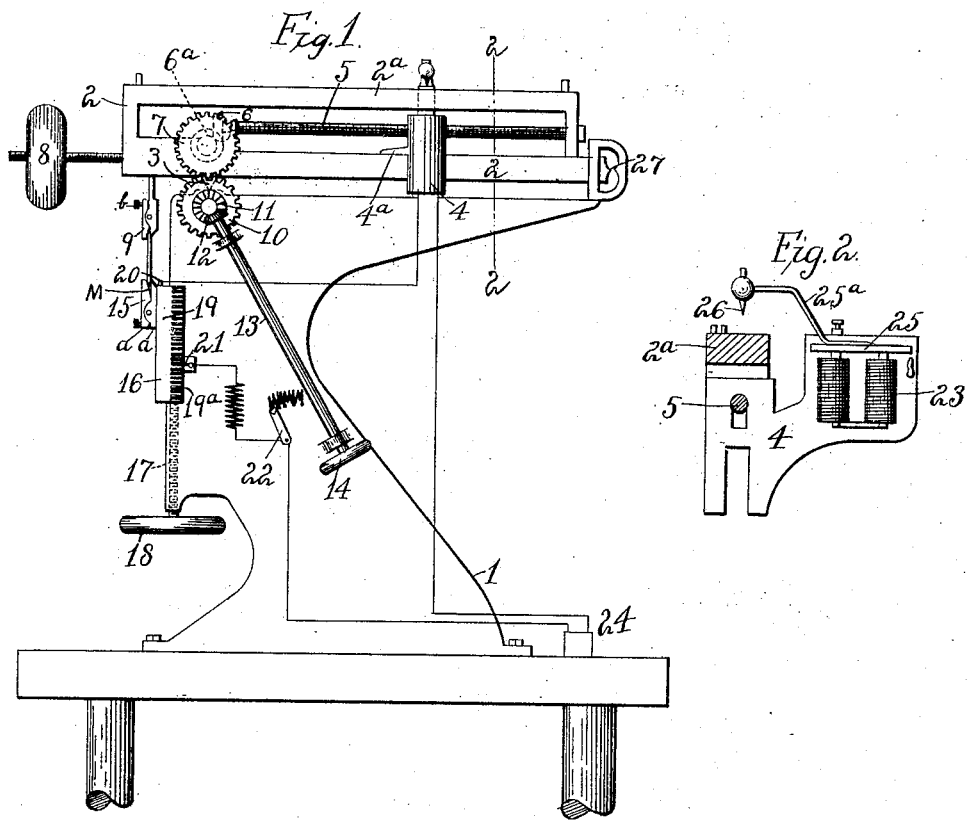
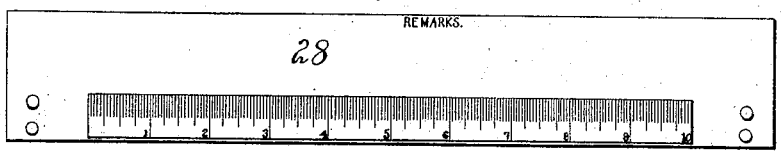
Attest.
Bent M. Stahl.
Ewd L. Folson
Inventor.
William W. Duncan
by Shum Middleton Donaldson
Attys

UNITED STATES PATENT OFFICE.

WILLIAM W. DUNCAN, OF BOSTON, MASSACHUSETTS, ASSIGNOR TO HOOD RUBBER COMPANY, OF BOSTON, MASSACHUSETTS.

TESTING-MACHINE.

No. 919,140.      Specification of Letters Patent.      Patented April 20, 1909.

Application filed July 20, 1908. Serial No. 444,414.

*To all whom it may concern:*

Be it known that I, WILLIAM W. DUNCAN, a citizen of the United States, residing at Boston, Massachusetts, have invented certain new and useful Improvements in Testing-Machines, of which the following is a specification.

The present improvement relates to improvements in testing machines and more particularly to devices for testing sheets or strips of vulcanized rubber.

In manufacturing articles requiring the use of vulcanized rubber sheets or strips it is essential that the rubber should be tested to ascertain both the strength and amount of stretch and that a record be made of these. If the strength is taken at the breaking point and the length of stretch noted it will not necessarily give any good idea of the degree of vulcanization or the value of the stock. In order to determine these points it is necessary to know the increment of strength for each interval of stretch, for instance, the number of kilograms required to stretch a given sized sheet or trip one centimeter, then the number of kilograms required to stretch the sheet two centimeters, then three centimeters, and so on until the sheet breaks. Then using the number of centimeters stretch as the abscissæ and the number of kilograms strength as the ordinates a curve of the test may be plotted. From the direction and appearance of this curve the degree of vulcanization and the value of the rubber sheet may be judged.

The object of the present invention is to provide an apparatus or machine by which strips or sheets may be easily tested as to strength and amount of stretch, and a correct record made by the machine of the exact strength at each degree of stretch, from which record the correct curve may be easily plotted.

The invention includes the novel features hereinafter described and particularly pointed out in the claims.

An embodiment of the invention is shown in the accompanying drawings, in which:—

Figure 1 is a side elevation of the apparatus. Fig. 2 is a section on line 2—2 of Fig. 1 looking toward the left. Fig. 3 is a plan view of the record sheet.

Referring by reference characters to this drawing, 1 is a cast iron stand as shown, upon which is mounted a special balance beam 2 on knife edges 3, this beam carrying the weight 4, which is moved along by the screw 5, turned by the miter gears 6, 6$^a$, which are operated by the gear 7. The weight is provided with a pointer 4$^a$ and when this is set at zero it is balanced by the weight 8 and the upper clamping device or grip 9. The weight 4 is slotted where it fits the screw 5 so that it can be lifted up and returned to zero without turning the screw. The gear 7 meshes with a gear 10 which is turned by the miter gears 11 and 12, the latter being carried by shaft 13 provided with operating handle 14.

The upper grip 9 for clamping one end of the rubber sheet or strip is carried by the beam 2 in rear of its pivot, as already indicated, while the lower grip 15 is movably carried by the frame or supporting standard directly beneath it. Each of these may conveniently be formed of two gripping members or jaws $a$, $a$, provided with a thumb screw $b$ for clamping them upon the end of the rubber strip. The lower movable grip 15 is carried by a sliding plate 16 guided on the supporting frame or standard and operated by a screw rod 17 provided with a handle 18. On the plate 16 is an ebonite scale 19 divided into centimeters by brass strips 19$^a$ which are all electrically connected to the binding screw 20 at the top of the plate. A small brass pointer or contact 21 is arranged to make contact successively with the strips as the scale 16 is moved down, this contact being in electrical connection, through switch 22 with the binding post of an electro-magnet 23 on the weight 4. The binding screw 20 is also electrically connected with the electro-magnet, the connections being very fine, light wire and including a source of current 24. On the top of the beam 2 is a shelf 2$^a$, on which is laid a strip of paper printed to correspond with the scale on the beam as shown in Fig. 4. The magnet 23 is provided with an armature 25 which has an extended arm 25$^a$ carrying a needle 26. When the magnet is energized the arm comes down forming a pin hole in the paper scale 28, which is placed on the shelf or table 2$^a$.

In the operation of the apparatus a sheet of rubber formed or cut to the proper size is fastened in the upper jaw, the weight 4 is placed at zero and the slide 16 moved up by the handle 18 until it registers zero, at the pointer 21. The other end of the sheet is placed in the lower jaw M and the beam B exactly balanced. By turning the wheel 18 with the left hand and the wheel 14 with the right hand, the sheet of rubber is stretched and the weight C slides along toward the right so as to keep the scale beam in equilibrium as indicated by pointers 27. When the stretch has become one centimeter the contact or brush 21 makes an electric connection through the brass strip energizing the magnet, pulling down the arm and causing the marking point to make a perforation in the printed scale which agrees with the reading that the pointer $4^a$, of the weight would give on the scale on the arm 2. The stretching of the rubber is continued and the weight moved to balance the stretch and at each centimeter stretch the arm marker makes a record on the printed scale of the record sheet similar to that made at the first centimeter, but giving the reading of the strength at the point on which the weight is when the connection is made. When the sheet breaks there will be formed on the paper scale or record sheet, a series of perforations which were made at every centimeter of stretch, and from these the curve can be plotted.

Having thus described my invention, what I claim is:—

1. In a testing machine, a scale beam having a movable weight, a gripping device connected therewith, a movable gripping device coöperating therewith, means for moving the latter, a distance scale coöperating with said movable gripping device, a record surface carried by the scale beam, a marking device movable with the weight, means for moving the weight to counter-balance the tension carried by the movement of the movable gripping device, and means whereby the marking device is automatically operated at determined intervals.

2. In a testing machine, a scale beam having a movable weight, a gripping device connected therewith, a movable gripping device coöperating with said first named gripping device, a distance scale having a plurality of electric contacts spaced to correspond to units of linear measurement, a brush coöperating with said contacts, one of said coöperating parts being movable with the movable gripping device, a table for a record strip carried by the scale beam, an electro-magnet movable with the weight, a marker adapted to be operated on the energizing of said magnet, and an electric circuit including said contacts, electro-magnet and a source of electric energy.

3. In a testing machine, a scale beam having a movable weight, a gripping device connected therewith, a movable gripping device coöperating with said first named gripping device, a distance scale having a plurality of electric contacts spaced to correspond to units of linear measurement, a brush coöperating with said contacts, one of said coöperating parts being movable with the movable gripping device, a table for a record strip carried by the scale beam, an electro magnet marking device carried by the movable weight, and adapted to mark on the strip carried by the table, and electric connections between the brush and distance scale and said electro-magnetic marking device.

4. In a testing machine, a pivoted scale beam having a movable weight, a screw journaled in the scale beam and engaging a correspondingly threaded part of the weight, a gripping device carried by the scale beam for holding one end of the strip to be tested, a movable gripping device opposite to said first named device for gripping the opposite end, a scale coöperating with said second gripping device, a hand wheel having operating connections for moving said movable gripping device to place tension on the strip to be tested, a second hand wheel located in proximity to said first named hand wheel, operating connections between said second hand wheel and the screw of the scale beam, said operating connections including gearing located at the point of pivoting of the scale beam, and means for making the record of the scale readings.

In testimony whereof, I affix my signature in presence of two witnesses.

WM. W. DUNCAN.

Witnesses:
   ALFRED A. GLIDDEN,
   FREDERICK F. READE.